United States Patent
Kamiya et al.

(10) Patent No.: US 8,483,219 B2
(45) Date of Patent: Jul. 9, 2013

(54) CONTROL APPARATUS

(75) Inventors: Akihiro Kamiya, Yokohama (JP); Yasumichi Nonaka, Yokohama (JP); Kazuhiro Kusama, Yokohama (JP); Kenji Kataoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 406 days.

(21) Appl. No.: 12/756,591

(22) Filed: Apr. 8, 2010

(65) Prior Publication Data
US 2010/0260184 A1 Oct. 14, 2010

(30) Foreign Application Priority Data

Apr. 10, 2009 (JP) .................. 2009-095531

(51) Int. Cl.
H04L 12/28 (2006.01)
H04L 12/56 (2006.01)

(52) U.S. Cl.
USPC .......................... 370/392; 370/389

(58) Field of Classification Search
USPC ........................ 370/392, 390, 389
See application file for complete search history.

(56) References Cited

U.S. PATENT DOCUMENTS

| | | | | |
|---|---|---|---|---|
| 7,054,557 B1 * | 5/2006 | Dasylva et al. | .................. | 398/48 |
| 2010/0124225 A1 * | 5/2010 | Fedyk | .......................... | 370/390 |

FOREIGN PATENT DOCUMENTS

JP 2007-060476 3/2007

OTHER PUBLICATIONS

B-ISDN user-network interface—Physical layer specification: General characteristics, ITU-T, Recommendation I.432.1, Feb. 1999.

* cited by examiner

*Primary Examiner* — Chuong T Ho

(74) *Attorney, Agent, or Firm* — Antonelli, Terry, Stout & Kraus, LLP.

(57) ABSTRACT

An arithmetic operation portion including a swap arithmetic operation portion which performs an arithmetic operation of swap information concerned with a path route of a packet, and a label processing portion which sets adjustment of a first label based on a result of the arithmetic operation executed by the swap arithmetic operation portion is provided in a control apparatus to thereby attain compatibility between dispersion of packet transfer load and reduction of an error rate in each link.

12 Claims, 15 Drawing Sheets

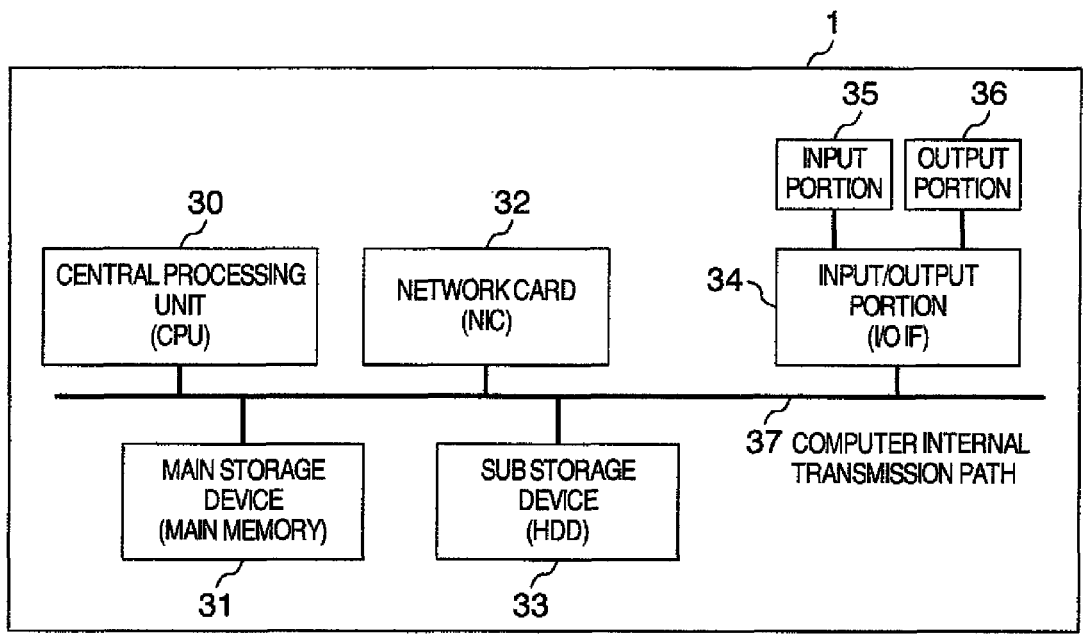

FIG.7

| PATH NAME | PATH ROUTE | START POINT PORT | END POINT PORT |
|---|---|---|---|
| Path 1 | C→B→D | C-IF01 | D-IF03 |
| Path 2 | A→E | A-IF01 | E-IF02 |
| Path 3 | A→B→D→E | A-IF01 | E-IF02 |

FIG.8

| NODE NAME | ROUTING LINE | PORT |
|---|---|---|
| A | Side01 | A-IF01 |
|   | Side02 | – |
|   | Side03 | A-IF02 |
|   | Side04 | A-IF03 |
| B | Side01 | B-IF01 |
|   | Side02 | B-IF02 |
|   | Side03 | B-IF03 |
|   | Side04 | – |
| C | Side01 | C-IF01 |
|   | Side02 | – |
|   | Side03 | C-IF02 |
|   | Side04 | – |
| D | Side01 | D-IF01 |
|   | Side02 | D-IF02 |
|   | Side03 | D-IF03 |
|   | Side04 | – |
| E | Side01 | E-IF01 |
|   | Side02 | – |
|   | Side03 | E-IF02 |
|   | Side04 | E-IF03 |

FIG.9

| NODE NAME | INPUT LABEL | PORT | OUTPUT LABEL | PORT |
|---|---|---|---|---|
| A | 0 | * | 0 | A-IF02 |
|   | 1 | * | 0 | A-IF03 |
|   | 2 | * |   |   |
|   | 3 | * |   |   |
|   | ⋮ | * |   |   |
| B | 0 | * | 0 | B-IF03 |
|   | 1 | * | 1 | B-IF03 |
|   | 2 | * |   |   |
|   | 3 | * |   |   |
|   | ⋮ | * |   |   |
| C | 0 | * | 1 | C-IF02 |
|   | 1 | * |   |   |
|   | 2 | * |   |   |
|   | 3 | * |   |   |
|   | ⋮ | * |   |   |
| D | 0 | * | 1 | D-IF02 |
|   | 1 | * | 1 | D-IF03 |
|   | 2 | * |   |   |
|   | 3 | * |   |   |
|   | ⋮ | * |   |   |
| E | 0 | * | 0 | E-IF02 |
|   | 1 | * | 1 | E-IF02 |
|   | 2 | * |   |   |
|   | 3 | * |   |   |
|   | ⋮ | * |   |   |

| PATH ROUTE | LABEL PATTERN |
|---|---|
| C→B→D | 0→1→1→1 |
| A→E | 0→0→0 |
| A→B→D→E | 1→0→0→1→1 |

| PATH SETTING | | | |
|---|---|---|---|
| | PATH NAME: | Path 3 | — G01 |
| | PATH ROUTE: | A→B→D→E | — G02 |
| | START POINT PORT: | A-IF01 | — G03 |
| | END POINT PORT: | E-IF02 | — G04 |
| | | SETTING | |
| | | | — G05 |

FIG.17

U00 ROUTE SPLIT TABLE

| | END POINT OF NON-SWAP ROUTE = END POINT OF PATH ROUTE | END POINT OF NON-SWAP ROUTE ≠ END POINT OF PATH ROUTE |
|---|---|---|
| START POINT OF NON-SWAP ROUTE = START POINT OF PATH ROUTE | NOT SPLIT | SPLIT THE PATH ROUTE INTO TWO AS FOLLOWS: R1: NON-SWAP ROUTE R2: JUST AFTER THE END POINT OF R1 - END POINT |
| START POINT OF NON-SWAP ROUTE ≠ START POINT OF PATH ROUTE | SPLIT THE PATH ROUTE INTO TWO AS FOLLOWS: R0: START POINT - JUST BEFORE THE START POINT OF R1 R1: NON-SWAP ROUTE | SPLIT THE PATH ROUTE INTO THREE AS FOLLOWS: R0: START POINT - JUST BEFORE THE START POINT OF R1 R1: NON-SWAP ROUTE R2: JUST AFTER THE END POINT OF R1 - END POINT |

FIG.18

| | END POINT OF NON-SWAP ROUTE = END POINT OF PATH ROUTE | END POINT OF NON-SWAP ROUTE ≠ END POINT OF PATH ROUTE |
|---|---|---|
| START POINT OF NON-SWAP ROUTE = START POINT OF PATH ROUTE | MINIMUM SWAP NUMBER: 0 MINIMUM PATTERN: LABEL PATTERN OF NON-SWAP ROUTE | MINIMUM SWAP NUMBER: MINIMUM SWAP NUMBER OF R1 + 1 MINIMUM PATTERN: ALL COMBINATIONS OF LABEL PATTERN OF NON-SWAP ROUTE AND MINIMUM PATTERN OF R1 |
| START POINT OF NON-SWAP ROUTE ≠ START POINT OF PATH ROUTE | MINIMUM SWAP NUMBER: MINIMUM SWAP NUMBER OF R0 + 1 MINIMUM PATTERN: ALL COMBINATIONS OF MINIMUM PATTERN OF R0 AND LABEL PATTERN OF NON-SWAP ROUTE | MINIMUM SWAP NUMBER: MINIMUM SWAP NUMBER OF R0 + MINIMUM SWAP NUMBER OF R1 + 2 MINIMUM PATTERN: ALL COMBINATIONS OF MINIMUM PATTERN OF R0, LABEL PATTERN OF NON-SWAP ROUTE AND MINIMUM PATTERN OF R1 |

CONTROL APPARATUS

INCORPORATION BY REFERENCE

The present application claims priority from Japanese application JP 2009-095531 filed on Apr. 10, 2009, the content of which is hereby incorporated by reference into this application.

BACKGROUND OF THE INVENTION

1. Field of the Invention

The present invention relates to a control apparatus and program for monitoring a communication network. Particularly, it relates to a system for controlling an MPLS (Multi-Protocol Label Switching) network.

2. Description of the Background Art

Nowadays, a transmission network accommodating various client protocols has been required toward transition to a next-generation network which will perform diversified services.

A method called MPLS (Multi-Protocol Label Switching) in which a frame or packet is transferred while an identifier called label is added to the frame or packet has attracted attention as a method for accommodating various client protocols.

In the next-generation network, high transmission quality is required of a communication path. In a network using a packet transfer method, if traffic exceeding the transfer throughput capacity of each node flows in a certain node, packet loss occurs to lower transmission quality. If traffic is concentrated in a certain node, packet loss occurs though the whole network still has a surplus throughput capacity.

Accordingly, if load can be dispersed or balanced by some method, accommodating efficiency in the whole network can be improved. Or the same traffic as that of the whole network can be accommodated in a network composed of nodes lower in throughput capacity.

A method of exchanging measured values of traffic between nodes and controlling a transfer path based on the exchanged measured values in order to disperse transfer load of respective nodes has been disclosed in JP-A-2007-060467.

On the other hand, lowering of quality due to packet loss is also caused by transmission error of link between respective nodes. A method of giving an error correction code intended for a header of each ATM (Asynchronous Transfer Mode) cell to the cell in an ATM network and correcting error based on this code for the purpose of reducing the transmission error rate of data has been disclosed in ITU-T, I.432.1, "B-ISDN user-network interface-Physical layer specification: General characteristics", 1999.

By dispersing the packet transfer load and reducing transmission error of each link, transmission quality of a communication path can be improved and the traffic can be accommodated in a network composed of nodes lower in throughput capacity.

When the same error correction method as ITU-T,I.432.1, "B-ISDN user-network interface—Physical layer specification: General characteristics", 1999 is applied to an MPLS network, another process of calculating an error correction code than a process of determining a transfer destination is required as a packet transfer process The fact that transmission quality of a communication path is lowered in an MPLS method not using an error correction code will be described first.

In the MPLS method in which an error correction code is not given, if there is 1-bit error in a label, correct path selection cannot be made. As a result, a packet is discarded or transferred to a different node. Because 1-bit error causes 1-packet loss, a BER (Bit Error Rate) increases. An example of packet transfer in the case where error occurs in a label will be described with reference to FIGS. 19 and 20. When a packet 200#6 marked with a label "30" is transferred to 200#7 and the value of the label is changed to "31" due to 1-bit error during the transfer, the packet is discarded if there is no setting that a packet having a label value of "31" to a node B is transferred to a node D, or the packet is transferred to a different node if there is a setting that a packet having a label value of "31" to the node B is transferred to the different node. In any case, packet loss occurs.

The fact that the load based on processing of the error correction code depends on the number of packets which perform label swapping (label swapping with changing value of label) will be described next.

FIG. 20 shows an example of a label using an error correction code. A switching portion of each node calculates a 3-byte error correction code 202 intended for error correction of a 12-byte label 201 and provides the error correction code 202 as a header portion to thereby achieve 1-bit error correction of the label.

Because the error correction code 202 is calculated based on the label 201 as described above, the error correction code 202 must be calculated whenever label swapping is performed. Accordingly, in the MPLS network in which an error correction code is introduced, increase of processing load according to each node in connection with label swapping becomes further larger. If the label swap processing load per node is too large, the processing time per packet becomes long. If the throughput capacity of each node is outstepped, packet delay and packet loss are brought.

SUMMARY OF THE INVENTION

In such circumstances, issues to be solved are to disperse the packet transfer processing load and to reduce the error rate of each link. The same issues may arise in a system using not only error correction but also a process (such as encryption) which needs to be re-executed in accordance with each label swap.

As described above, the load based on processing of the error correction code increases as the number of packets performing label swapping increases. Accordingly, when the label swapping process is dispersed, the load based on processing of the error correction code can be dispersed.

Further, because increase of load based on processing of the error correction code is a factor causing occurrence of packet loss, improvement of transmission quality and improvement of traffic accommodating efficiency can be made when the load based on processing of the error correction code is dispersed.

If a very long label is defined so that a packet can be transferred with the same label from a start point to an end point, the load based on processing of the error correction code can be reduced because label swapping is not required. The MPLS method is however characterized in small overhead due to a short label, so that transfer efficiency is lowered if such a long label is used.

It is therefore necessary to provide a process of dispersing a label swapping process to each node while reducing the label swapping process as sufficiently as possible in order to reduce the load based on processing of the error correction code while the transfer efficiency is kept high.

The aforementioned issues can be solved by provision of a method which reduces determines a given label to reduce the number of label swaps in the whole network and disperse the number of label swaps to each node as sufficiently as possible.

For example, a control apparatus according to the present invention includes a communication processing portion which is connected to nodes for transmission/reception of a packet marked with a first label and which transmits/receives a control signal to/from the nodes, and an arithmetic operation portion which is connected to the communication processing portion, wherein: the arithmetic operation portion includes a swap arithmetic operation portion which performs an arithmetic operation of swap information concerned with a path route of the packet, and a label processing portion which sets adjustment of the first label based on a result of the arithmetic operation executed by the swap arithmetic operation portion; and the communication processing portion transmits/receives the control signal to/from the nodes based on the setting executed by the label processing portion.

It is possible to achieve a packet transport system in which packet discard rate is reduced without lowering of transfer efficiency.

Other objects, features and advantages of the invention will become apparent from the following description of the embodiments of the invention taken in conjunction with the accompanying drawings.

BRIEF DESCRIPTION OF THE DRAWINGS

FIG. 5 is a hardware block diagram of the management system;
FIG. 6 is a view for explaining a network topology table;
FIG. 7 is a view for explaining a path table;
FIG. 8 is a view for explaining a device table;
FIG. 9 is a view for explaining a label table;
FIG. 10 is a view for explaining label patterns;
FIG. 11 is a view showing a set path screen in the management system;
FIG. 17 is a view showing a route split (division) table;
FIG. 18 is a view showing an output table.

DETAILED DESCRIPTION OF THE INVENTION

Figure 1:
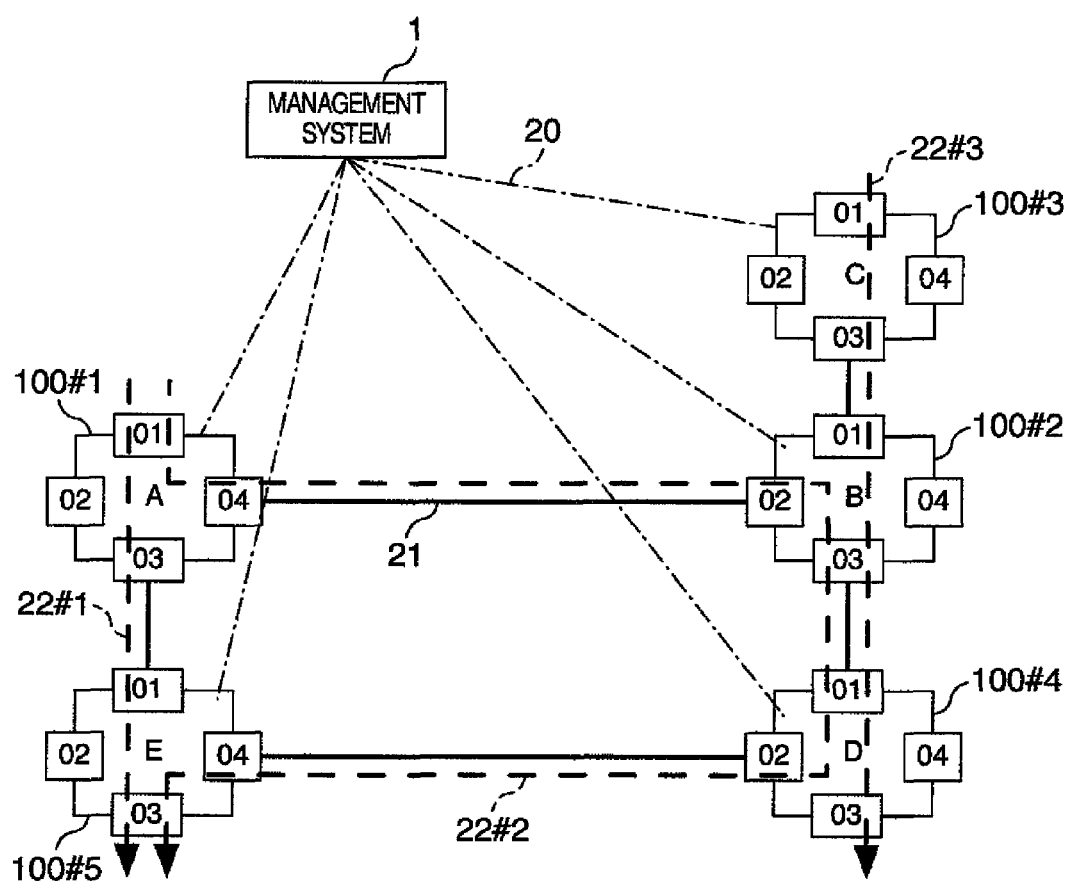
FIG. 1 is a diagram showing the configuration of an MPLS system.

The best mode of the present invention will be described below with reference to the drawings in connection with an embodiment.
Embodiment 1
The configuration of an MPLS system will be described with reference to FIG. 1. In FIG. 1, five MPLS nodes (node devices) 100#1 to 100#5 form an MPLS network. The respective MPLS nodes 100 are connected to one another by an inter-node network 21.

The MPLS nodes 100 are logically connected to a management system 1 while MPLS nodes 100#1 and 100#4 connected by a management information transfer network 20 other than a main circuit are used as gateways. The management system 1 remotely monitors and controls the MPLS nodes 100 through the management information transfer network 20.

Connection ports of the MPLS nodes 100 to the inter-node network 21 are defined as "Side01", "Side02", "Side03" and "Side04".

Although Embodiment 1 shows the case where the number of connection ports of each MPLS node to the inter-node network 21 is 4 at maximum, the upper limit of the number of connection ports is not determined for carrying out this embodiment because this embodiment can be carried out if the number of connection ports is not smaller than 2.

Figure 4:
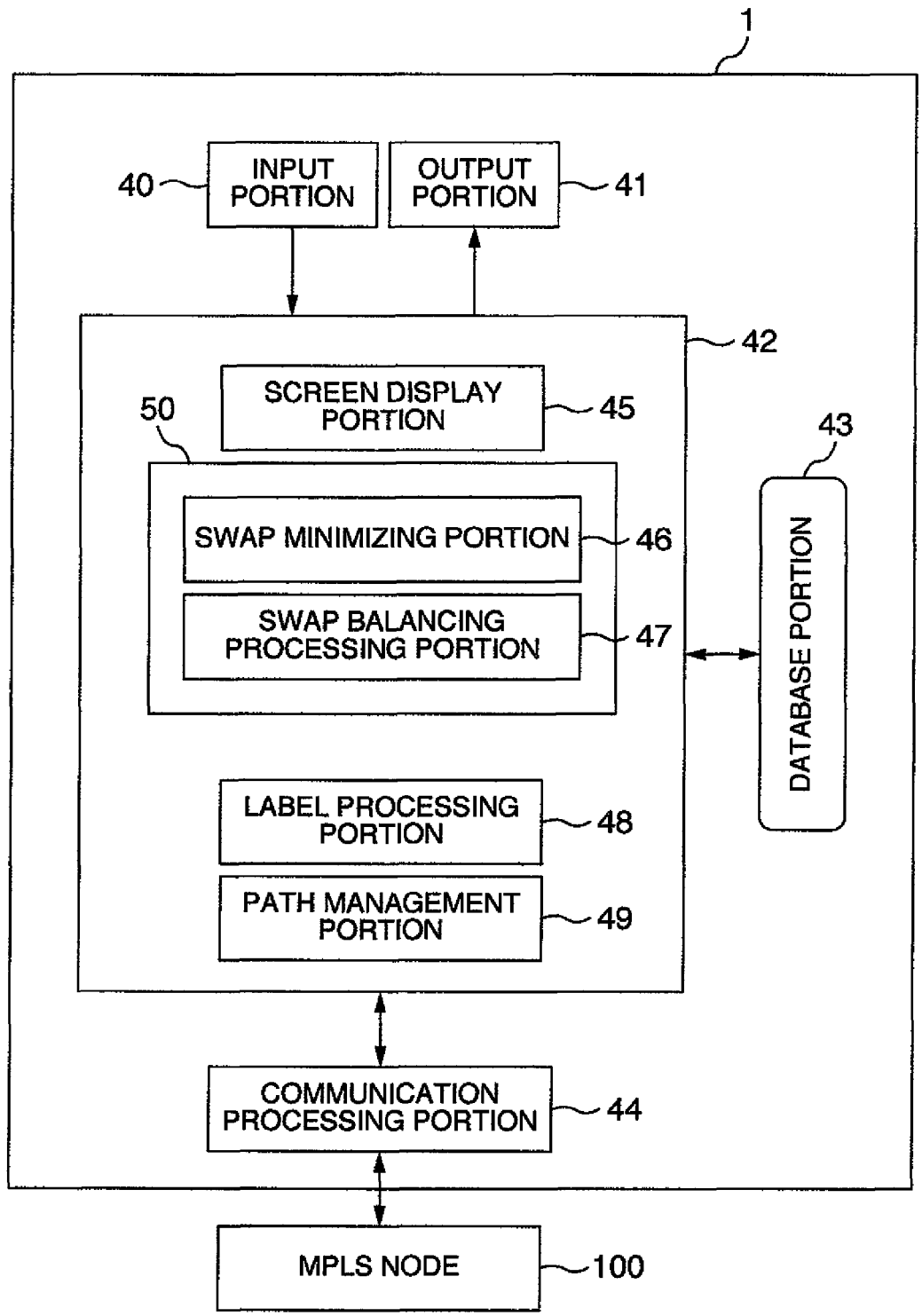
FIG. 4 is a functional block diagram of a management system.

The management system 1 sets a path 22 by setting labels in the respective MPLS nodes 100 through a label processing portion 48 and a communication processing portion 44 shown in FIG. 4. Respective portions will be described later in detail.

Although FIG. 1 shows a network example, the form of physical network topology can be configured freely for carrying out this embodiment. For example, ring-like topology, linear topology, tree-type topology or mesh topology can be used. Topology of the management information transfer network 20 can be configured freely likewise.

Figure 2:
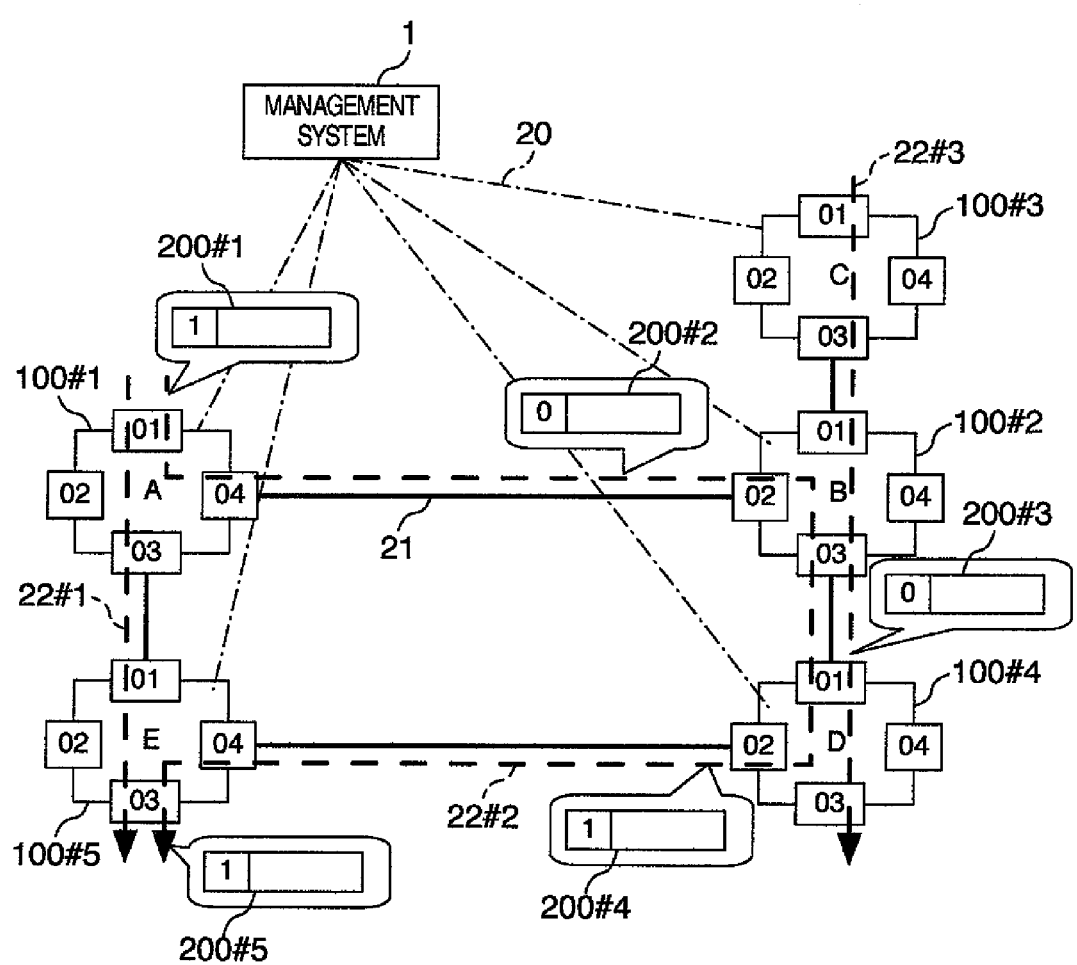
FIG. 2 is a diagram showing label switching path.

A path using label swapping will be described with reference to FIG. 2. Assume a path 22#2 for transferring a packet 200#1 marked with a label "1" from a node 100#1 to a node 100#5 via nodes 100#2 and 100#4. The setting [a packet marked with a label "1" is transferred in a West direction while the label "1" is rewritten into a label "0"] is given to the node 100#1 by the management system 1. The setting [a packet marked with a label "0" is transferred in a South direction while the label "0" is left intact] is given to the node 100#2 by the management system 1. The setting of label swapping is given to the nodes 100#4 and 100#5 by the management system 1 likewise, so that setting of the path 22#2 for transferring the packet 200 is achieved.

Figure 3:
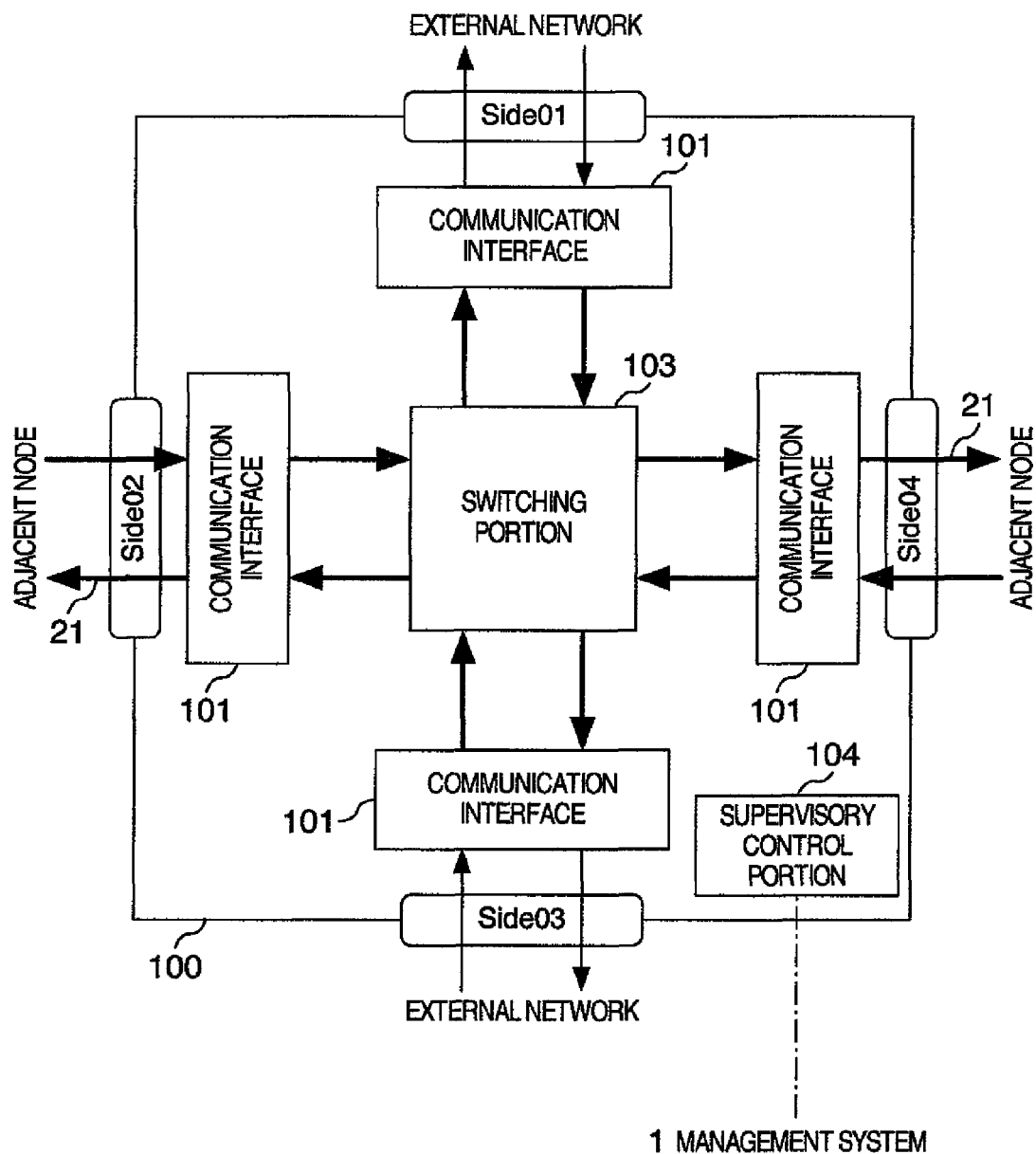
FIG. 3 is a block diagram of an MPLS node.

The configuration of each MPLS node 100 will be described with reference to FIG. 3. In FIG. 3, the MPLS node 100 has communication interfaces 101, a switching portion 103, and a supervisory control portion 104.

Packet transfer in the MPLS node 100 will be described below.

A flow of a packet at communication between MPLS nodes 100 will be described. A packet transferred from between MPLS nodes 100 is transferred to the switching portion 103 by one communication interface 101. Then, the switching portion 103 performs label swapping and error correction code donating, and then transfers the packet to another one communication interface 101. Then, the communication interface 101 transfers the packet to an adjacent node through the inter-node network 21.

A flow of packet transfer from an external network to an MPLS node 100 will be described. A packet transferred from an external network is transferred to the switching portion 103 by a communication interface 101. Then, the switching portion 103 performs label swapping and error correction code donating, and then transfers the packet to the communication interface 101. Then, the communication interface 101 transfers the packet to an adjacent node through the inter-node network 21.

A flow of packet transfer from an MPLS node 100 to an external network will be described. A packet transferred from an MPLS node 100 is transferred to the switching portion 103 by a communication interface 101. Then, the switching portion 103 performs label swapping and error correction code donating, and then transfers the packet to the communication interface 101. Then, the communication interface 101 transfers the packet to an external network.

Respective portions will be described below in detail.

When each communication interface 101 is connected to the inter-node network 21, the communication interface 101 performs packet transmission/reception to/from an adjacent MPLS node 100. A packet received from an adjacent MPLS node 100 is converted into a proper signal, and then transferred to the switching portion 103. Conversely, a packet received from the switching portion 103 is converted into a proper signal, and then transferred to an adjacent MPLS node 100.

When each communication interface 101 is connected to a cable outside the MPLS network, the communication interface 101 performs packet transmission/reception to/from a node outside the MPLS network. A packet received from a node outside the MPLS network is converted into a proper signal, and then transferred to the switching portion 103. Conversely, a packet received from the switching portion 103 is converted into a proper signal, and then transferred to a node outside the MPLS network.

Although FIG. 3 shows the case where the communication interfaces 101 of routing lines Side01 and Side03 are used for connection to external networks and the communication interfaces 101 of routing lines Side02 and Side04 are used for connection to adjacent nodes, respective connection destinations of the communication interfaces 101 are not fixed based on the routing lines, that is, free in execution of the invention. For example, the communication interface of Side01 can be used for connection to an adjacent node.

The switching portion 103 refers to the label given to the received packet and the input port and performs label swapping in accordance with a label table set in the MPLS node 100, error correction code calculation and donating, and packet transfer to a destination communication interface 101 or communication interfaces 101.

The supervisory control portion 104 collects alarms and event notifications detected at the communication interfaces 101 and the switching portion 103, and notifies the management system 1 of a result of the collection. The supervisory control portion 104 performs label table setting for the switching portion 103 under control of the management system 1.

The management system 1 is a general information processing apparatus such as a personal computer (PC) or a work station (WS). Software for managing paths 22 is installed in the management system 1, so that the software is started up by a user. The configuration of the management system 1 will be described with reference to FIG. 4. FIG. 4 is a functional block diagram of the management system 1.

In FIG. 4, the management system 1 is operated by the user using an input portion 40 and an output portion 41. An arithmetic operation portion 42 performs an arithmetic operation necessary for monitoring and controlling each MPLS node 100 and holds necessary information in a database portion 43. The arithmetic operation portion 42 transmits a communication instruction to a communication processing portion 44 for execution of an instruction in the MPLS node 100 to thereby achieve communication between the management system 1 and the MPLS node 100. The arithmetic operation portion 42 includes a screen display portion 45, a swap arithmetic operation portion 50, a label processing portion 48, and a path management portion 49.

The screen display portion 45 displays a set path screen G00 (FIG. 11). The screen display portion 45 will be described later with reference to FIG. 11. The label processing portion 48 updates the database portion 43 and transmits a communication instruction (control signal) to the communication processing portion 44 based on a result of the arithmetic operation executed by the swap arithmetic operation portion 50. The path management portion 49 updates information in the database portion 43 based on a newly set path after execution of path setting. The swap arithmetic operation portion 50 includes a swap minimizing portion 46, and a swap balancing processing portion 47. The swap arithmetic operation portion 50 performs an arithmetic operation of swap information concerned with a path route of a packet. The swap minimizing portion 46 and the swap balancing processing portion 47 handle a swap minimizing process B00 (FIG. 13) and a swap balancing process E00 (FIG. 16) respectively. The swap minimizing portion 46 and the swap balancing processing portion 47 will be described later with reference to FIGS. 13 to 16.

The hardware configuration of the management system 1 will be described with reference to FIG. 5. FIG. 5 is a hardware block diagram of the management system. In FIG. 5, the management system 1 includes a central processing unit (CPU) 30, a main storage device (main memory) 31, a network card (NIC: Network Interface Card) 32, an input/output portion 34, a sub storage device 33, and an input portion 35 and an output portion 36 connected to the input/output portion 34. The CPU 30, the main memory 31, the MC 32, the input/output portion 34 and the sub storage device 33 are connected to one another by an internal transfer path 37.

As is obvious from comparison between FIGS. 4 and 5, the functions 45 to 50 of the arithmetic operation portion 42 are achieved by the CPU 30 executing programs on the main storage device 31.

FIGS. 6, 7, 8 and 9 show tables held in the database portion 43 of the management system 1. Respective portions will be described below in detail.

A network topology table T00 held in the database portion 43 of the management system 1 will be described with reference to FIG. 6.

After the communication interfaces 101 are mounted in each MPLS node 100 and hardware connection such as connection of an in-device cable, connection of the inter-node network, etc. is performed in each MPLS node 100, the user registers information of the MPLS node 100 as the network topology table T00 in the management system 1. The network topology table T00 shown in FIG. 6 is composed of node name information T01, IP address information T02, Side01 connection destination information T03, Side02 connection destination information T04, Side03 connection destination information T05, and Side04 connection destination information T06.

A path table T10 held in the database portion 43 of the management system 1 will be described with reference to FIG. 7.

When path setting is performed, path information is added to the path table by the management system 1. In FIG. 7, the path table T10 is composed of path name information T14, path route information T12, start point port information T13, and end point port information T14.

A device table T20 held in the database portion 43 of the management system 1 will be described with reference to FIG. 8.

When the communication interfaces 101 are registered by the management system 1, the user selects routing lines Side01, Side02, Side 03 and Side04. The management system 1 adds information of correspondence of the communication interfaces 101 with the routing lines to the device table T20 in accordance with a result of the user's selection. In FIG. 8, the device table T20 is composed of node name information T21, routing line information T22, and port information T23.

A label table T30 held in the database portion 43 of the management system 1 will be described with reference to FIG. 9.

When path setting is performed by the management system 1, information of input ports/labels and output ports/labels set in respective devices is added to the label table T30 in accordance with a result of the arithmetic operation executed by the swap arithmetic operation portion 50. In FIG. 9, the label table T30 is composed of node name information T31, input label information T32, input port information T33, output label information T34, and output port information T35. Because FIG. 9 shows an example in which all input ports in the label table T30 have the same information "*", the label table does not depend on input ports but is designed so that only input labels can be referred to.

Label patterns used in the swap arithmetic operation portion 50 will be described with reference to FIGS. 2 and 10. FIG. 10 shows label patterns by way of example. The management system 1 uses label patterns temporarily for the arithmetic operation executed by the swap arithmetic operation portion 50 but does not hold the label patterns as a table.

The label given to a packet changes whenever the packet passes each MPLS node 100 on a route of a path 22. A pattern of transition states of the label connected by arrows is referred to as label pattern. For example, it may be said that the label pattern of a path 22#2 having a path route A→B→D→E in FIG. 2 is 1→0→0→1→1. It can be conformed from FIG. 10 that the label pattern of a path route A→B→D→E is 1→0→0→1→1.

A set path screen example G00 in the management system 1 will be described with reference to FIG. 11.

The screen display portion (input portion) 45 of the management system 1 displays a set path screen G00. The user inputs a path name G01, a path route G02, a start point port G03 and an end point port G04. When the user pushes down an setting button (input means of a path setting instruction) G05, the management system 1 confirms normal inputting of the path name G01, the path route G02, the start point port G03 and the end point port G04 and executes a path setting process A00.

Figure 12:
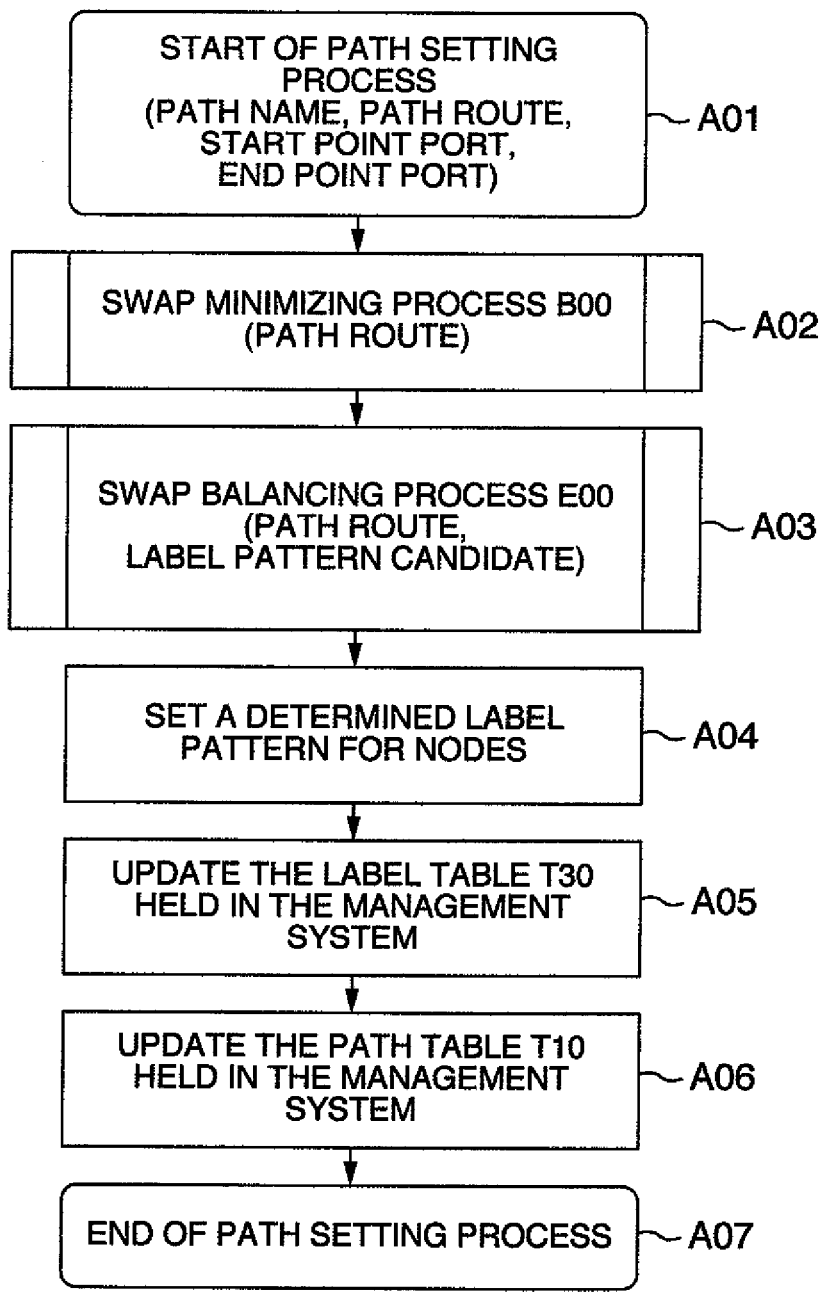
FIG. 12 is a flow chart of a path setting process.

The path setting process A00 will be described later with reference to FIG. 12.

The path setting process A00 executed by the management system 1 will be described with reference to FIG. 12.

In the path setting process A00, the management system 1 executes the swap minimizing process B00 to calculate label pattern candidates capable of minimizing the number of swaps by using user's input information on the set path screen G00, executes the swap balancing process E00 to calculate a label pattern capable of distributing the number of swaps most between nodes, sets the determined label pattern for nodes, and updates the label table T30 and the path table T10 held in the management system.

Respective parts of the path setting process A00 will be described below in detail.

The management system 1 starts the path setting process by using the path name, the path route, the start point port and the end point port input by the user on the set path screen G00 (A01).

The swap arithmetic operation portion 50 of the management system 1 receives the path route input in A01 as an input and executes the swap minimizing process B00 (A02). The swap minimizing process B00 will be described later with reference to FIG. 13.

The swap minimizing portion 46 of the management system 1 receives the path route input by the user on the set path screen G00 and the label pattern candidates output from A02 as inputs and executes the swap balancing process E00 (A03). The swap balancing process E00 will be described later with reference to FIG. 16.

The label processing portion 48 of the management system 1 performs communication through the communication processing portion 44 by using the label pattern output from A03 and the start point port and the end point port input in A01 and referring to the node name information T01 and the IP address information T02 of the network topology table T00 with respect to each MPLS node 100 on the path route to thereby perform label setting (A04).

The label processing portion 48 of the management system 1 adds the label pattern output from A03 to the label table T30 held in the database portion 43 (A05).

The path management portion 49 of the management system 1 adds the path name, the path route, the start point port and the end point port input in A01 to the path table T10 held in the database portion 43 of the management system 1 (A06).

The management system 1 terminates the path setting process A00 after the aforementioned processing (A07).

Figure 13:
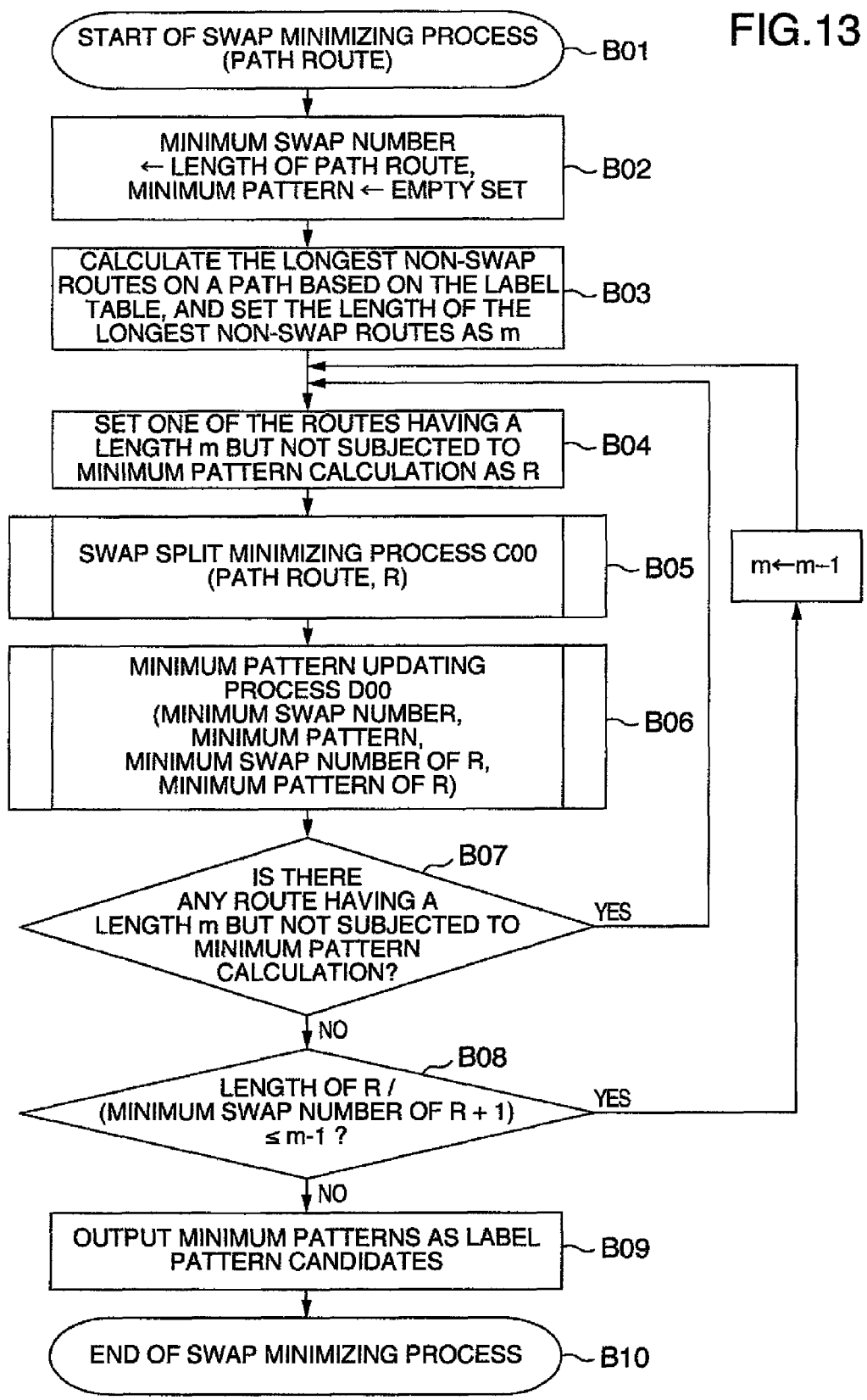
FIG. 13 is a flow chart of a swap minimizing process for minimizing number of swap.

The swap minimizing process B00 executed by the swap arithmetic operation portion 50 (especially, the swap minimizing portion 46) of the management system 1 will be described with reference to FIG. 13.

The sum of the numbers of swaps in the case where the sum of the numbers of swaps in MPLS nodes 100 on a path is minimized with respect to the input path route is referred to as minimum swap number, and a label pattern (or label patterns) in this case is referred to as minimum pattern. In the path route, a section capable of transferring the packet without swapping is referred to as non-swap route. The minimum swap number of a non-swap route is zero.

In the swap minimizing process B00, the management system 1 calculates the longest non-swap routes in the label table on a path after initialization of the minimum swap number and the minimum pattern. There may be a plurality of routes as the longest non-swap routes. A swap split minimizing process C00 is executed for all the longest non-swap routes to thereby calculate the minimum swap number and minimum pattern of each non-swap route. The minimum swap numbers and minimum patterns of the respective non-swap routes and the minimum swap number and minimum pattern are subjected to minimum swap number and minimum pattern updating in a minimum pattern updating process D00, so that minimum patterns based on calculation of the minimum patterns of all the longest non-swap routes are output as label pattern candidates.

Respective parts of the swap minimizing process B00 will be described below in detail.

The swap minimizing portion 46 of the management system 1 starts the swap minimizing process by using the input path route (B01).

The swap minimizing portion 46 substitutes the length of the path route for the initial value of the minimum swap number and substitutes an empty set for the initial value of the minimum pattern (B02).

The swap minimizing portion 46 performs an arithmetic operation of label availability on a path by using the label table T30 held in the database portion 43 to thereby calculate the longest ones of routes which are pars of the path rout and which has the swap number of 0, and set the length of the longest routes as m. There may be a plurality of routes as the routes having a length m (B03).

One of the routes having the swap number of 0 and having a length m is set as R (B04).

The swap minimizing portion 46 receives the path route input in B01 and R defined in B04 as inputs and executes the swap split minimizing process C00 (B05). The swap split minimizing process C00 will be described later with reference to FIG. 14.

The swap minimizing portion 46 receives the minimum swap number and minimum pattern defined in B02 and the minimum swap number and minimum pattern of R output from B05 as inputs and executes the minimum pattern updating process D00 (B06). The minimum pattern updating process D00 will be described later with reference to FIG. 15.

The swap minimizing portion 46 determines whether there is any route having the swap number of 0 and having a length m but not subjected to B05 and B06. When there is any route not subjected to the steps B05-B06, the steps B05-B06 are executed for the route. When there is no route, processing is changed to B08 (B07).

Although the minimum swap number calculated in B04-B07 is a result of summation of the minimum swap numbers of respective routes in B06 after splitting in B05, there may be a route having a smaller swap number as the whole route before splitting. To search for this route, the swap minimizing portion 46 substitutes m−1 for m and executes the steps B04-B06 when the following discriminant is satisfied.

R: route subjected to the swap split minimizing process in B05

Length of R/(minimum swap number of R+1)≦m−1

The discriminant uses the property that the length of the longest one of routes having the swap number of 0 is not smaller than the length of the route/(the minimum swap number of the route+1).

Because the determination steps B07 and B08 are used, the steps B05 and B06 can be executed for all routes capable of minimizing the number of swaps so that the swap minimizing portion 46 outputs minimum patterns as label pattern candidates (B09). The management system 1 terminates the swap minimizing process B00 after the aforementioned processing (B10).

Figure 14:
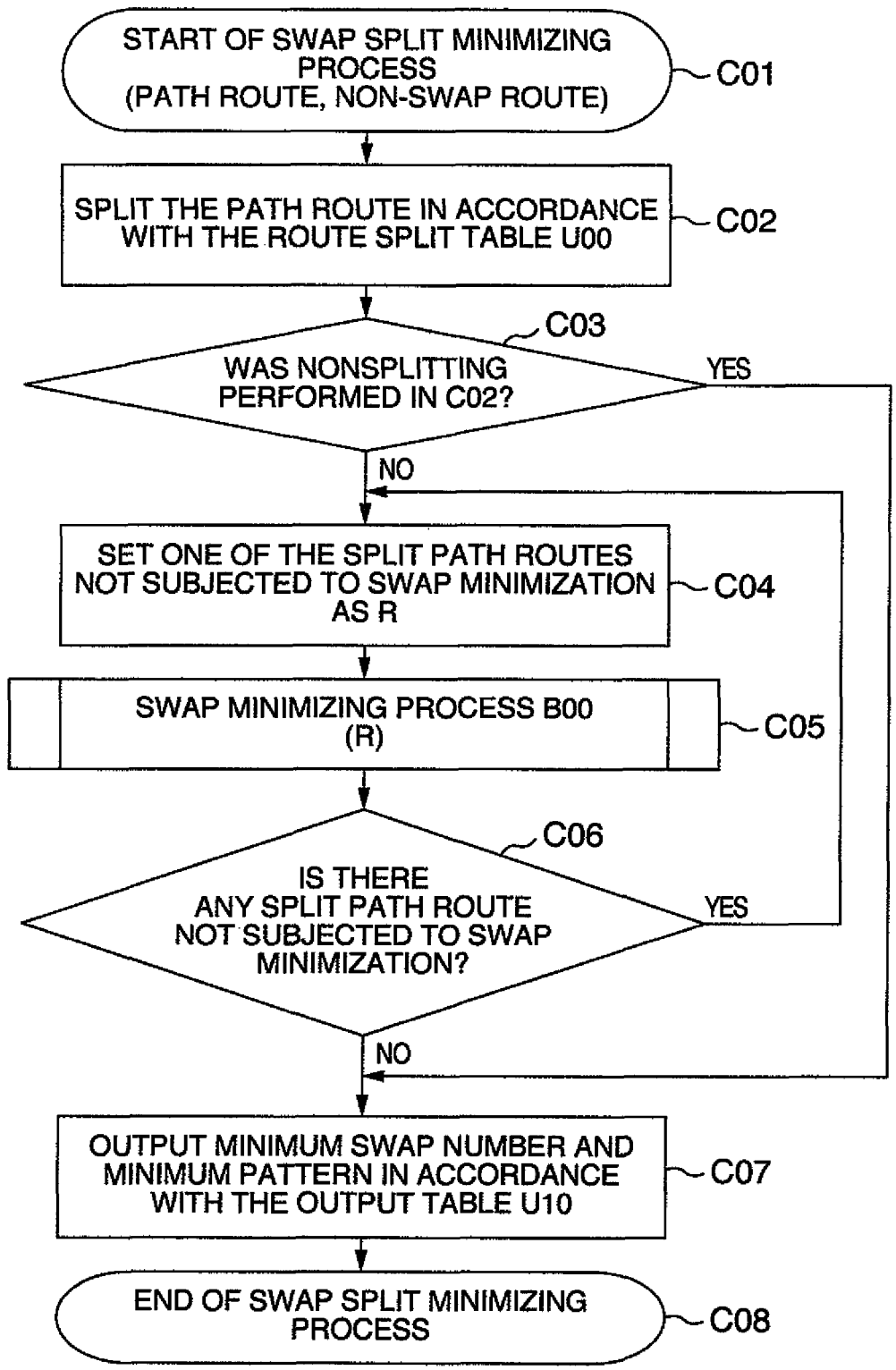
FIG. 14 is a flow chart of a swap split (division) minimizing process.

The swap split minimizing process C00 executed by the swap arithmetic operation portion 50, especially, the swap balancing processing portion 47 of the management system 1 will be described with reference to FIG. 14.

When the path route is split, path routes after splitting are referred to as split path routes.

In the swap split minimizing process C00, the management system 1 splits the path route into a non-swap route and another part (or other parts) in accordance with a route division table U00 which will be described with reference to FIG. 17. When determination is made that the path route is not split based on the split table U00, that is, when the path route matches with the non-swap route, the label pattern of a non-swap route having the minimum swap number of 0 is output as the minimum pattern in accordance with an output table U10. When determination is made that the path route is split based on the split table U00, the swap minimizing process B00 is executed for all the split path routes so that the minimum swap number and minimum pattern are output in accordance with the output table U10 which will be described with reference to FIG. 18. The swap split minimizing process C00 is called from the swap minimizing process B00 and the swap minimizing process B00 is called from the swap split minimizing process C00 so that the path route is split recursively until the path route cannot be split any more.

Respective parts of the swap split minimizing process C00 will be described below in detail.

The swap minimizing portion 46 starts the swap split minimizing process by using the input path route and the non-swap route (C01).

The swap minimizing portion 46 splits the path route input in C01 in accordance with the route division table U00 (C02).

The swap minimizing portion 46 determines whether non-splitting was performed in C02 or not (C03). When nonsplitting was performed, processing is changed to C07. C07 will be described later. When nonsplitting was not performed (i.e. splitting was performed), one of path routes after splitting (hereinafter referred to as split path routes) is set as R (C04).

The swap minimizing portion 46 receives R defined in C04 as an input and executes the swap minimizing process B00 (C05).

The swap minimizing portion 46 determines whether there is any split path route not subjected to the swap minimizing process B00. When there is any split path route not subjected to the swap minimizing process, the swap minimizing portion 46 receives the split path route as an input and executes the swap minimizing process B00. When there is no split path route not subjected to the swap minimizing process, processing is changed to C07 (C06).

The swap minimizing portion 46 outputs the minimum swap number and minimum pattern in accordance with the output table U10 (C07).

The management system 1 terminates the swap split minimizing process C00 after the aforementioned processing (C08).

The route division table U00 used in C02 of the swap split minimizing process by the swap minimizing portion 46 will be described with reference to FIG. 17.

The route division table U00 shows how to perform route splitting by using information of the start point and end point of the path route and the start point and end point of the non-swap route input in C01. When the start point of the non-swap route matches with the start point of the path route, and when the end point of the non-swap route matches with the end point of the path route, the path route is not split (U01). When the start point of the non-swap route does not match with the start point of the path route, and when the end point of the non-swap route matches with the end point of the path route, the path route is split into two routes, that is, the non-swap route and another route (U02). When the start point of the non-swap route matches with the start point of the path route, and when the end point of the non-swap route does not match with the end point of the path route, the path route is split into two routes, that is, the non-swap route and another route (U03). When the start point of the non-swap route does not match with the start point of the path route, and when the end point of the non-swap route does not match with the end point of the path route, the path route is split into three routes, that is, the non-swap route and other two routes (U04).

The output table U10 used in C07 of the swap split minimizing process by the swap minimizing portion 46 will be described with reference to FIG. 18.

The output table U10 shows how to output the minimum swap number and minimum pattern by using information of the start point and end point of the path route and the start point and end point of the non-swap route input in C01 and the minimum swap number and minimum pattern of each split route.

When the start point of the non-swap route matches with the start point of the path route, and when the end point of the non-swap route matches with the end point of the path route, 0 and the non-swap route are outputted as the minimum swap number and the minimum pattern, respectively (U11). When the start point of the non-swap route matches with the start point of the path route, and when the end point of the non-swap route does not match with the end point of the path route, a value obtained by adding 1 to the minimum swap number of the split route other than the non-swap route is output as the minimum swap number and a route based on all combinations of the non-swap route and the split route other than the non-swap route is output as the minimum pattern (U12). The reason why 1 is added is because swapping occurs between the non-swap route and the split route other than the non-swap route. When the start point of the non-swap route does not match with the start point of the path route, and when the end point of the non-swap route matches with the end point of the path route, a value obtained by adding 1 to the minimum swap number of the split route other than the non-swap route is output as the minimum swap number and a route based on all combinations of the non-swap route and the split route other than the non-swap route is output as the minimum pattern (U13). The reason why 1 is added is because swapping occurs between the non-swap route and the split route other than the non-swap route. When the start point of the non-swap route does not match with the start point of the path route, and when the end point of the non-swap route does not match with the end point of the path route, a value obtained by adding 2 to the sum of the minimum swap numbers of the split routes other than the non-swap route is output as the minimum swap number and a route based on all combinations of the non-swap route and the split routes other than the non-swap route is output as the minimum pattern (U14). The reason why 2 is added is because swapping occurs between the non-swap route and the split routes other than the non-swap route.

Figure 15:
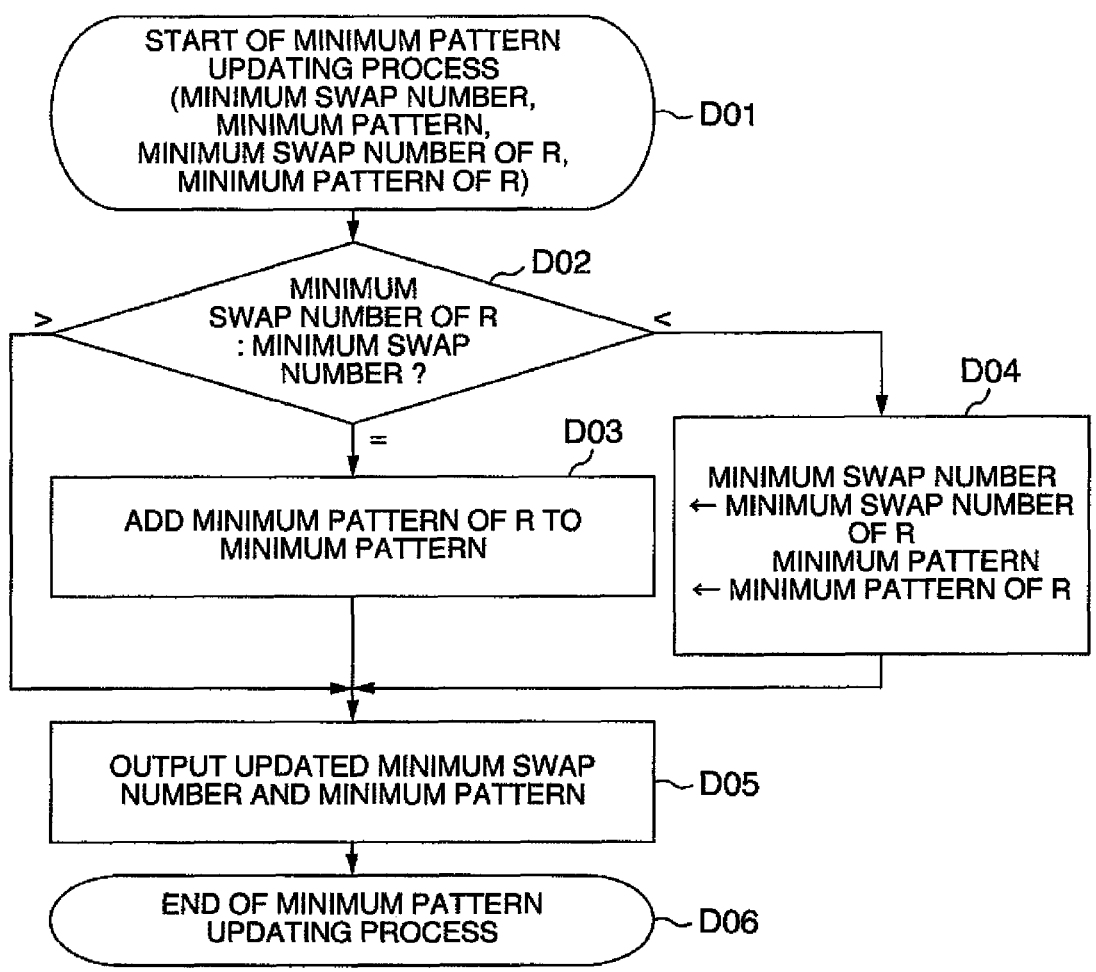
FIG. 15 is a flow chart of a minimum pattern updating process.

The minimum pattern updating process D00 executed by the management system 1 will be described with reference to FIG. 15.

In the minimum pattern updating process D00, the management system 1 compares inputs and performs overwriting when the minimum swap number of R is smaller than the minimum swap number used until that time but performs addition when the minimum swap number of R is equal to the minimum swap number used until that time.

Respective parts of the minimum pattern updating process D00 will be described below in detail.

The swap minimizing portion 46 starts the minimum pattern updating process D00 by using the input minimum swap number and minimum pattern and the minimum swap number and minimum pattern of R (D01).

The swap minimizing portion 46 performs an arithmetic operation of comparison between the minimum swap number of R and the minimum swap number (D02). When the minimum swap number of R is larger than the minimum swap number, the swap minimizing portion 46 changes processing to D05 without updating of the minimum swap number and minimum pattern. When the minimum swap number of R is equal to the minimum swap number, the swap minimizing portion 46 adds the minimum pattern of R to the minimum pattern (D03) and changes processing to DOS. When the minimum swap number of R is smaller than the minimum swap number, the swap minimizing portion 46 substitutes the minimum swap number of R for the minimum swap number, substitutes the minimum pattern of R for the minimum pattern (D04) and changes processing to D05.

The swap minimizing portion 46 outputs the updated minimum swap number and minimum pattern (D05).

The management system 1 terminates the minimum pattern updating process D00 after the aforementioned processing (D06).

Figure 16:
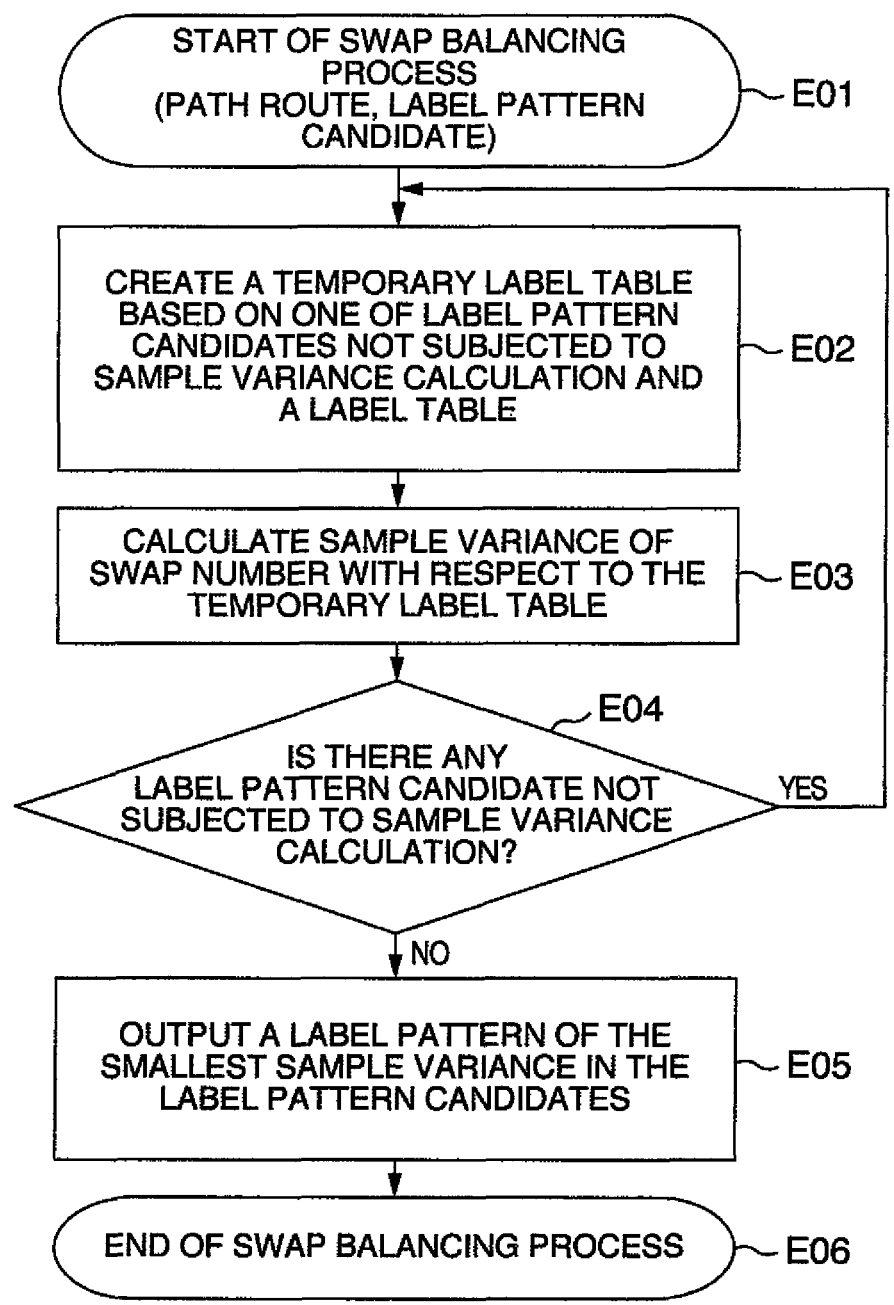
FIG. 16 is a flow chart of a swap balancing process for balancing number of swap.
Figure 19:
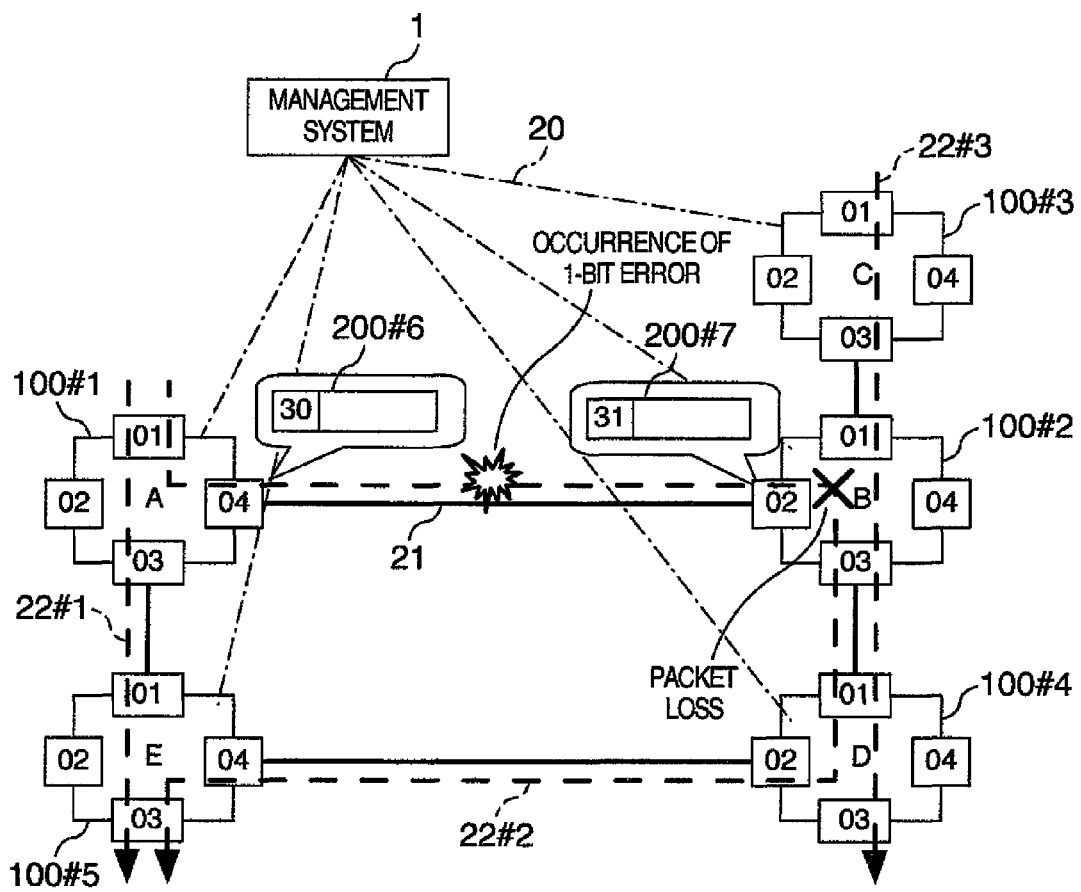
FIG. 19 is a diagram for explaining the height of a BER in the MPLS system.
Figure 20:
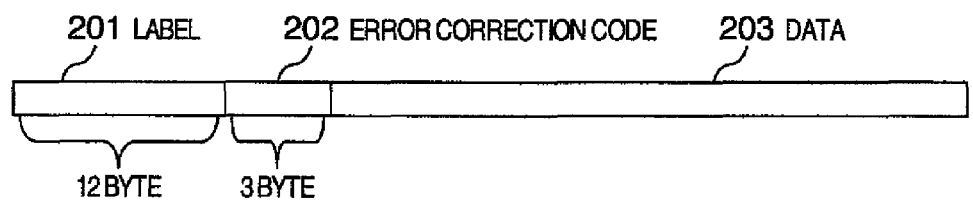
FIG. 20 is a view showing a label model of error correcting code.

The swap balancing process E00 executed by the management system 1 will be described with reference to FIG. 16.

In the swap balancing process E00, the management system 1 calculates sample variances (information of degree of dispersion) of swap numbers in use of label pattern candidates for all the label pattern candidates and outputs a label pattern smallest in sample variance.

Respective parts of the swap balancing process E00 will be described below in detail.

The swap balancing processing portion 47 starts the swap balancing process E00 by using the input path route and label pattern (E01).

The swap balancing processing portion 47 creates a temporary label table in use of one of the label pattern candidates by using one of the label pattern candidates not subjected to sample variance calculation and the label table T30 held in the database portion 43 (E02).

The swap balancing processing portion 47 calculates sample variance of swap numbers based on the temporary label table created in E02 (E03). The following method is used for calculation of sample variance of swap numbers. Swap numbers are calculated in accordance with nodes by the temporary label table. Sample variance $\sigma^2$ with respect to swap numbers according to nodes is calculated by the following numerical expression:

$$\text{Sample variance } \sigma^2 = \frac{1}{n}\sum_{i=1}^{n}(\overline{x} - x_i)^2$$

in which n is the number of nodes on a path, $x_i$ is the number of swaps in the i-th node when nodes on a path are counted from the start point, and $\overline{x}$ is an average of $x_1, x_2, \ldots, x_n$.

For example, assume that the path route input in E01 is A→B→C→D→E, and that the numbers of swaps according to nodes in use of a certain label pattern candidate are (3, 1, 2, 2, 4). Sample variance of this label pattern can be calculated as 1.04 by the aforementioned numerical expression.

Sample variance is generally used as a marker indicating dispersion of a sample from a sample average in statistics. The swap balancing processing portion 47 determines whether there is any label pattern candidate not subjected to sample variance calculation (E04). When there is any label pattern candidate not subjected to sample variance calculation, the steps E02 and E03 are executed to calculate sample variance. When there is no label pattern candidate not subjected to sample variance calculation, processing is changed to E05.

The swap balancing processing portion 47 outputs a label pattern candidate smallest in sample variance in the label pattern candidates as a label pattern. When there are label pattern candidates smallest in sample variance, a label pattern candidate which is the head in lexicographic order is output as a label pattern (E05).

In statistics, as the value of sample variance becomes larger, dispersion becomes larger. By selecting a label pattern candidate smallest in sample variance, the numbers of label swaps can be dispersed in between nodes.

The management system 1 terminates the swap balancing process E00 after the aforementioned processing (E06).

Even if table configurations of the network topology table T00, the path table T10, the device table T20 and the label table T30 vary, this embodiment can be achieved as long as information of configuration of network topology based on nodes, information of path control, information of correspondence of the communication interfaces with routing lines and information for determining the transfer routing line from a label given to a packet can be provided.

Even if screen configuration of the set path screen example G00 varies, this embodiment can be achieved as long as means for inputting information necessary for setting a path can be provided.

Even if the processing sequence in the path setting process A00 varies, this embodiment can be achieved as long as a label pattern provided to minimize the number of swaps and dispersed in accordance with each node can be determined and a flow of label setting in nodes and reflection of information on the management system 1 can be provided by use of a result of the determination.

Even if different algorism is used in the swap minimizing process B00, this embodiment can be achieved as long as the swap minimizing process B00 can be provided as a process of calculating label pattern candidates to minimize the number of swaps.

Even if different algorism is used in the swap balancing process E00, this embodiment can be achieved as long as the swap balancing process E00 can be provided as a process of calculating a label pattern to disperse the number of swaps in accordance with each node.

Although a system using error correction has been described in Embodiment 1, this embodiment can be applied to a system using a process such as encryption to be executed hop by hop.

According to the aforementioned embodiment, a label pattern which is smallest in the total swap number and in which the number of swaps is dispersed most in between nodes can be used when path setting is performed by the management system 1. When the label pattern which is smallest in the total swap number and in which the number of swaps is dispersed most in between nodes is used, load per node can be suppressed and a risk of packet loss can be reduced so that an MPLS network high in reliability can be achieved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus comprising:
   at least one of a hardware processor and circuitry configured to effect portions including:
   a communication processing portion which is connected to nodes for transmission/reception of a packet marked with a first label, and which transmits/receives a control signal to/from the nodes, and
   an arithmetic operation portion which is connected to the communication processing portion, wherein:
   the arithmetic operation portion includes a swap arithmetic operation portion which performs an arithmetic operation of swap information concerned with a path route of the packet, and a label processing portion which sets adjustment of the first label based on a result of the arithmetic operation executed by the swap arithmetic operation portion;
   the communication processing portion transmits/receives the control signal to/from the nodes based on the setting executed by the label processing portion; and
   the control a apparatus, including the communication processing portion, the arithmetic operation portion, swap arithmetic operation portion and label processing portion is provided as a component discrete from the nodes.

2. A control apparatus according to claim 1, further comprising a database portion which stores information concerned with the first label and the path route.

3. A control apparatus according to claim 1, further comprising a database portion which stores information concerned with the first label and the path route, wherein the label processing portion reads the information from the database portion based on a result of the arithmetic operation executed by the swap arithmetic operation portion, and sets the first label and a second label corresponding to the swap information in the nodes.

4. A control apparatus according to claim 1, wherein the swap arithmetic operation portion performs an arithmetic operation of the swap information to minimize the number of swaps by referring to the database portion with respect to the path route.

5. A control apparatus according to claim 1, wherein the swap arithmetic operation portion performs an arithmetic operation of the swap information to disperse swap regions in the path route.

6. A control apparatus according to claim 2, wherein the database portion stores label pattern information corresponding to the path route as the information.

7. A control apparatus according to claim 2, wherein the database portion stores information of correspondence with the path route, a start point port and an end point port, as the information.

8. A control apparatus according to claim 6, wherein the swap arithmetic operation portion calculates information of degree of dispersion with respect to the label pattern information.

9. A control apparatus according to claim 1, wherein the swap arithmetic operation portion extracts the longest route by referring to the information, and performs an arithmetic operation of the swap information by using the longest route.

10. A control apparatus according to claim 1, further comprising an input portion which receives the path route and a start point port and an end point port of the path route, as inputs.

11. A control apparatus according to claim 1, further comprising an input portion which receives the path route, a start point port and an end point port of the path route and a path setting instruction, as inputs.

12. A control apparatus according to claim 2, wherein the label processing portion searches the database portion based on inputs received by the input portion, and performs setting based on a result of the search.

* * * * *